United States Patent [19]

Matsui et al.

[11] Patent Number: 5,407,503
[45] Date of Patent: Apr. 18, 1995

[54] PROCESS FOR PRODUCING SILICON CARBIDE NOZZLE

[75] Inventors: Shigetomo Matsui, Higashiosaka; Hiroyuki Matsumura, Kobe; Yoshikazu Ikemoto, Kobe; Hideki Shimizu, Kobe; Tatsuo Obata; Masashi Shigeto, both of Yokohama, all of Japan

[73] Assignee: Kawasaki Jukogyo Kabushiki Kaisha, Hyogo, Japan

[21] Appl. No.: 139,045

[22] Filed: Oct. 21, 1993

Related U.S. Application Data

[60] Continuation of Ser. No. 989,921, Dec. 11, 1992, abandoned, which is a division of Ser. No. 603,842, Oct. 29, 1990, abandoned.

[30] Foreign Application Priority Data

Oct. 31, 1989 [JP] Japan .................. 1-283545

[51] Int. Cl.6 ............... B29C 41/00; B29C 13/00
[52] U.S. Cl. ..................... 156/89; 156/242; 156/294; 228/131; 228/262.2; 264/60; 264/81
[58] Field of Search ............ 264/81, 139, 317, 138, 264/60; 156/89, 242, 294; 29/890.09; 239/DIG. 19; 228/131, 262.2

[56] References Cited

U.S. PATENT DOCUMENTS

| | | | |
|---|---|---|---|
| 3,011,912 | 12/1961 | Gareis et al. | 264/81 |
| 3,961,003 | 6/1976 | Parsels | 264/81 |
| 4,401,729 | 8/1983 | Claussen | 428/450 |
| 4,500,483 | 2/1985 | Veltri et al. | 264/81 |
| 4,511,612 | 4/1985 | Hüther | 428/450 |
| 4,555,872 | 12/1985 | Yie | 51/439 |
| 4,861,533 | 8/1989 | Bertin et al. | 264/81 |
| 4,999,228 | 3/1991 | Matsumoto | 428/34.4 |
| 5,011,566 | 4/1991 | Hoffman | 65/3.2 |

FOREIGN PATENT DOCUMENTS 63-50700 4/1988 Japan .

OTHER PUBLICATIONS

Ceramic Engineering and Science Proceedings, vol. 8, Nos. 7–8, Jul.–Aug., pp. 958–967, P. Regan et al.: "CVD Silicon Carbide Components".

Chemical Abstracts, vol. 71, No. 22, 1st Dec. 1969, Abstract No. 104773m, E. L. Kern et al. "Fabricating silicon carbide parts by chemical vapor deposition".

Primary Examiner—Christopher A. Fiorilla
Attorney, Agent, or Firm—Wenderoth, Lind & Ponack

[57] ABSTRACT

A tube is formed from a polycrystalline silicon carbide having a density of from 3.18 to 3.21 g/cm$^3$, a maximum impurity content of 20 ppm, and imperviousness to fluids by a process which comprises precipitating the silicon carbide on the surface of a rod-shaped graphite structure by a chemical vapor-phase synthesis method and thereafter removing the graphite structure. A water-jet nozzle of high resistance to abrasive wear can be produced by using this tube as an inner tube thereof to form the flow path for a water jet to be ejected therethrough.

8 Claims, 1 Drawing Sheet

PROCESS FOR PRODUCING SILICON CARBIDE NOZZLE

This application is a continuation of now abandoned application Ser. No. 07/989,921 filed Dec. 11, 1992, which was a divisional of now abandoned application Ser. No. 07/603,842 filed Oct. 29, 1990.

BACKGROUND Of THE INVENTION

The present invention relates generally to tubular structures such as water-jet nozzles for working articles with water jets propelled at high velocity, and to a process for the production thereof. More particularly, the invention relates to a silicon carbide tube to be used particularly for a nozzle to eject a water jet of the abrasive type containing particles of abrasives such as garnet and alumina admixed therein, and to a process For producing the tube.

As is known, a water-jet working or machining apparatus operates to eject water under high pressure through a nozzle of small throat diameter thereby to render the water into a jet of supersonic velocity and direct this jet against a workpiece material to work same. By this technique, almost any kind of material such as plastics, papers, and metal alloys can be worked. During this working or machining, there is almost no scattering of dust or generation of heat, and three-dimensional machining is also possible. In order to further increase the precision and speed of the working process, abrasive type water jets containing particles of abrasives such as alumina and garnet are also being developed.

The inner surface of the nozzle constituting the low path and orifice for discharging the water jet is subject to severe abrasion and wear. Accordingly, materials such as cemented carbide alloys, refractory hard metals, and alumina ceramics are ordinarily being used for these nozzles. There are also nozzles made of sintered skeletons of cubic boron nitride as disclosed, for example, in Japanese Utility Model Appln. Laid-Open No. 63-50700 published Apr. 6, 1988. These materials, however, are of high price. Moreover, in the present state of the art, these materials do not exhibit durability to a degree commensurately expectable from the intrinsic hardnesses of these materials.

Silicon carbide is a material next in hardness to diamond and cubic boron nitride. Moreover its precipitation by the vapor-phase synthesis method is relatively easy. Therefore, silicon carbide is a promising material for nozzles of the instant character.

Formed articles of silicon carbide of the prior art have been produced by mixing various sintering aids such as carbon, boron, and aluminum into a fine powder of silicon carbide synthesized by the Acheson process, for example, forming the mixture into the desired shape, and then sintering the same. It has been found that, when this material is used for a water-jet nozzle, it does not exhibit a durability expectable from the intrinsic hardness of silicon carbide. The cause of this disappointing result is considered to be that, because the sintering aids wear away priorly, or the bonding with the sintering aids is insufficient, the particles of silicon carbide become free and drop off, whereby the intrinsic hardness of silicon carbide cannot be amply utilized.

Another problem encountered hitherto has been the severe requirement for precision of shape because of the minute inner diameter of a water-jet nozzle of the order of 1 mm. For this reason, the forming of a water-jet nozzle from sintered silicon carbide has been thought to be difficult.

We have made a study of chemical vapor-phase synthesis processes with the view of providing a process for obtaining immediately in a desired shape a silicon carbide of high purity containing no sintering aids. As a result, we have found that a nozzle produced by such a process has a performance superior to that of a conventional sintered silicon carbide product. We have thus arrived at the present invention.

SUMMARY OF THE INVENTION

According to one aspect of this invention, there is provided a tube comprising polycrystalline silicon carbide of impervious property of a density of from 3.18 to 3.21 g/cm$^3$ and an impurity content of a maximum of 20 ppm.

According to another aspect of this invention there is provided a process for producing the above described tube which process comprises precipitating silicon carbide by a vapor-phase synthesis method on the surface of graphite in the shape of a rod and thereafter removing the graphite.

The nature, utility, and further features of this invention will be more clearly apparent from the following detailed description including that of preferred embodiments of the invention when read in conjunction with the accompanying drawing.

DESCRIPTION OF THE PREFERRED EMBODIMENTS

Figure 1:
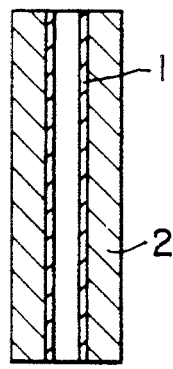
FIG. 1 is a side view, in longitudinal section, of a nozzle in which a silicon carbide tube of this invention is used.

The higher the density of the tube material, the more desirable it is. The tube of this invention is 3.18 g/cm$^3$ or higher. The upper limit of this density can be made almost equal to the theoretical density of 3.21 g/cm$^3$. Moreover, the resulting material is almost fully impervious to gases.

The silicon carbide tubes of this invention can be of various forms as illustrated by only a few examples in the accompanying drawing. Suitable dimensions of the tubes when they are used as nozzles are within ranges of outer diameter of 1 to 10 mm and of inner diameter of 0.1 to 4.8 mm.

These tubes are produced in the following manner.

It is not possible to fabricate a tube of this invention by sintering by using a powder of silicon carbide. The tube can be made by chemical vapor-phase synthesis.

For preparing silicon carbide by a chemical vapor-phase synthesis process, a substance to become the base material is necessary. In the practice of this invention, for fabricating silicon carbide in the form of a nozzle, a base material of the shape of a cylindrical rod of a specific diameter is used. The substance is graphite. Particularly in the case where impurities are to be avoided, refined graphite is used. Each rod is fabricated to a length conforming to the length of the water-jet nozzle. Then, silicon carbide is deposited onto the base material by evaporation by a chemical vapor-phase method. In this connection, the thermal expansion coefficient of the silicon graphite to be evaporation deposited is approximately $4.5\times10^{-6}1/°$ C. For this reason, a graphite of a thermal expansion coefficient of from $4.5\times10^{-6}$ to $5.0\times10^{-6}$ $1/°$ C. was used for the base material.

As the chemical vapor-phase method, any suitable known method may be used. One example of such a method is that in which a silane hydrocarbon such as methyltrichlorosilane and hydrogen gas are used. Another example is a method in which a silane gas and a hydrocarbon gas diluted with hydrogen gas are used. Still another example is a method in which SiO gas and CO gas which are generated from $SiO_2$ and carbon (graphite) are used.

By such a chemical vapor-phase method, a graphite base material of rod shape covered with silicon carbide to a specific coating thickness is obtained. By cutting this base material to a specific length and removing the graphite base material by an oxidation method in air, a tube of silicon carbide of a specific desired shape can be fabricated. The tube thus fabricated can be used by any of various methods. One is the method of brazing or bonding the tube to the inner surface of an ultrahard nozzle. Another is the method of depositing silicon carbide to a great thickness and using the tube directly as it is.

By a chemical vapor-phase synthesis process as described above, a polycrystalline silicon carbide of high purity not containing any sintering aid is obtained. Moreover, since the polycrystalline particles are finely bonded, the product has a high density and is impervious to fluids. When this is used as a water-jet nozzle, its resistance to abrasive wear is remarkably improved.

EXAMPLES

By machining a workpiece of isotropic graphite, a round rod G (FIG. 7) of graphite of a diameter of 1.8 mm and a length of 45 mm was obtained. This round rod G as a base material was heated at 1,700° C. in a gaseous atmosphere of SiO and CO gases thereby to precipitate a polycrystalline film 1a of silicon carbide of a film thickness of 2 mm on the surface of the round rod G.

Figure 7:
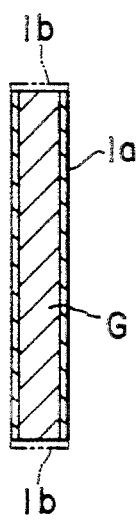
FIG. 7 is a view explanatory of the process according to this invention.

The silicon carbide film 1a thus deposited on the end faces of the round rod G was scraped off as indicated at 1b in FIG. 7. The rod G together with the film 1a was then heated at 800° C. in air, whereupon the rod G is burned and removed and a silicon carbide tube of an inner diameter of 1.8 mm, a wall thickness of 2 mm, and a length of 40 mm was obtained.

The thus obtained tube had a density of 3.21 g/cm³ and an impurity content of 5 ppm and was almost completely impervious to gases.

By this method, various tubes as described below were fabricated and used as nozzles.

A general side view in longitudinal section of a nozzle in which the above described tube is used is shown in FIG. 1. This structure comprises the tube 1 and an outer cylinder 2 enveloping the tube 1 for protecting and reinforcing the same. This example illustrates the case where an inner cylinder, consisting of silicon carbide tube 1 of circular cross section having a constant diameter in its longitudinal direction, is fixed integrally to the interior wall surface of an outer cylinder 2 made of a metal or an ultrahard metal alloy. This fixing between the inner and outer cylinders is carried out by a method such as brazing or bonding. However, in the case where the outer diameter of the tube is large, shrinkage fitting is also possible.

In the operation of the nozzle of the above described construction, an ultrahigh-velocity jet of water containing abrasive particles therein passes through the ejection orifice formed by the tube. The inner wall of this ejection orifice is formed from a polycrystalline silicon carbide of excellent resistance against abrasive wear. Therefore the rate of its wear is low, whereby the tube can withstand use over a long service period.

Figure 2:
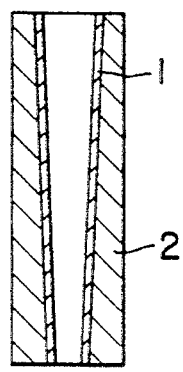
FIGS. 2 through 6 are similar views respectively illustrating other modes of practice of the invention.

In another preferred mode of practice of this invention as shown in FIG. 2, the inner diameter of the polycrystalline silicon carbide tube 1 varies linearly at a constant rate in a tapering manner in the longitudinal direction, decreasing toward the discharge end at the bottom as viewed in the figure. The tube 1 and the outer cylinder 2 are fixedly joined by the same method as in the first example.

Figure 3:
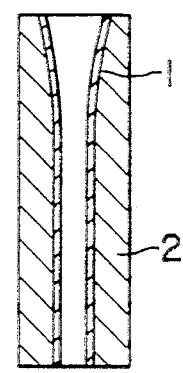

In still another mode of practice of this invention as illustrated in FIG. 3, the inner diameter of the silicon carbide tube 1 varies continuously in the longitudinal direction, whereby the contour of each side of the tube 1 as viewed in the sectional view of FIG. 3 is a continuous fair curve. The tube 1 and the outer cylinder 2 are fixedly joined in the same manner as in the preceding examples.

Figure 4:
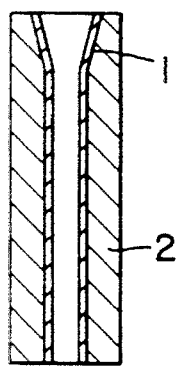

In still another mode of practice of this invention as shown in FIG. 4, the silicon carbide tube 1 is funnel shaped at the entrance end thereof. The tube 1 and the outer cylinder 2 are fixedly joined in the same manner as in the preceding examples.

Figure 5:
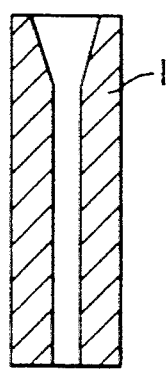

FIG. 5 illustrates one example of a further mode of practice of this invention in which a polycrystalline silicon carbide tube 1 is a homogeneous unit structure of a thick wall constituting a nozzle without an outer cylinder 2. In this case where the wall of the tube 1 is thick, the tube can be used without the outer cylinder 2 to function as a reinforcing part. Furthermore, it is also possible to machine (grind) the tapered funnel-shaped entrance after the tube 1 has been formed. Depending on the necessity, the outer cylindrical surface can also be processed.

Figure 6:
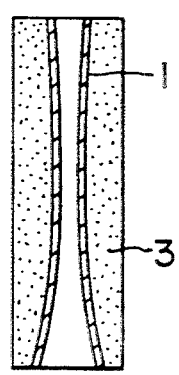

In a further mode of practice of this invention as shown in FIG. 6, the tube 1 is reinforced by an outer cylinder 3 which is a sintered metal structure. The polycrystalline silicon carbide tube 1 and the outer cylinder 3 are sintered together to form an integral structure. In this example, the inner diameter of the tube 1 varies continuously, contracting in the downward direction from the entrance to a constricted throat portion and then expanding toward the discharge orifice. The contour of this tube 1 as viewed in the longitudinal section of FIG. 6 comprises two continuous fair curves in symmetrical opposition.

In the above described examples, the present invention has been described with respect to wear resistant structures made of silicon carbide prepared by vapor-phase synthesis and adapted for use as nozzles for ejecting ultrahigh-velocity jets containing abrasives and passing therethrough. However, the invention is not limited to such application. It will be obvious, of course, that the tube of the invention can be applied with equally good results to ejection nozzles for discharging jets of ultrahigh-pressure fluids or high-pressure fluids in which no abrasives have been admixed.

Furthermore, with respect to the above described examples of modes of practice and other possible modes, various modifications and alternative combinations are possible in features such as the shapes of the inner wall surfaces of the tubes in longitudinal section and in cross section, the external shape, and the method of joining of the inner tube and the outer cylinder. It is to be understood that all such modifications and alternative arrangements are intended to be within the purview of this invention.

As described above, a polycrystalline silicon carbide tube according to this invention can be used as a structure constituting an inner wall surface in the fabrication of a nozzle for ejecting a fluid under high pressure. For this reason, the diameter of the high-velocity jet ejected from the nozzle remains stable over a long period. Accordingly the frequency of replacement of the nozzle is decreased, and the work efficiency and material working precision are greatly improved.

What is claimed is:

1. A process for producing a water-jet nozzle for use in machining articles with an abrasive water jet propelled therethrough, comprising the steps of:

machining an outer surface of a cylindrical rod-shaped graphite structure, so that it has an outer surface portion corresponding in dimension exactly to an internal hole of the water-jet nozzle to be produced;

depositing high-density and high-purity silicon carbide on the outer surface of the graphite structure by a vapor-phase synthesis method, so that the silicon carbide forms a cylindrical tubular structure on the graphite structure, the tubular structure having a density of from 3.18 to 3.21 g/cm$^3$ and a maximum impurity content of 20 ppm;

thereafter heating the graphite structure together with said tubular structure in air to oxidize the graphite structure to leave only said tubular structure; and fixedly securing an enveloping outer metal or metal alloy cylinder to an outer surface of said tubular structure, thereby obtaining the water-jet nozzle having an internal hole of high precision and high durability to abrasion and wear.

2. The process according to claim 1 wherein said step of depositing silicon carbide comprises the step of:

heating the rod-shaped graphite structure in a gaseous atmosphere of a compound or compounds containing silicon and carbon to deposit a polycrystalline film of silicon carbide on the graphite structure.

3. The process according to claim 2, wherein said step of heating the rod-shaped graphite structure for depositing silicon carbide is carried out at 1,700° C.

4. The process according to claim 1, further comprising the step of:

scraping off the silicon carbide deposited on end faces of the rod-shaped graphite structure before heating the graphite structure together with said tubular structure.

5. The process according to claim 1, wherein said enveloping outer cylinder is secured to said tubular structure by brazing.

6. The process according to claim 1, wherein said enveloping outer cylinder is secured to said tubular structure by bonding.

7. The process according to claim 1, wherein said enveloping outer cylinder is secured to said tubular structure by sintering.

8. The process according to claim 1, wherein said silicon carbide tubular structure has an outer diameter of from 1 to 10 mm and an inner diameter of from 0.1 to 4.8 mm.

* * * * *